United States Patent
Badger et al.

(10) Patent No.: US 8,977,417 B2
(45) Date of Patent: Mar. 10, 2015

(54) SYSTEM AND METHOD FOR CONTROLLING A VEHICLE HAVING A SINGLE-WIRE ACTUATOR

(71) Applicant: Ford Global Technologies, LLC, Dearborn, MI (US)

(72) Inventors: Justin R. Badger, Plymouth, MI (US); Angel Fernando Porras, Dearborn, MI (US); Michael Paul Lindlbauer, Canton, MI (US); Christopher Adam Ochocinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 13/838,946

(22) Filed: Mar. 15, 2013

(65) Prior Publication Data

US 2014/0114516 A1    Apr. 24, 2014

Related U.S. Application Data

(60) Provisional application No. 61/716,482, filed on Oct. 19, 2012.

(51) Int. Cl.
*B60W 20/00* (2006.01)
*B60H 1/00* (2006.01)
*B60H 1/22* (2006.01)

(52) U.S. Cl.
CPC ........... *B60W 20/00* (2013.01); *B60H 1/00385* (2013.01); *B60H 1/2218* (2013.01); *Y10S 903/903* (2013.01); *B60H 2001/2253* (2013.01)
USPC ............................ 701/22; 180/65.21; 903/903

(58) Field of Classification Search
USPC ......... 701/22, 33.9; 340/435; 180/65.265, 65, 180/275; 237/12.3 B, 5
See application file for complete search history.

(56) References Cited

U.S. PATENT DOCUMENTS

| | | | |
|---|---|---|---|
| 5,063,516 A | 11/1991 | Jamoua | |
| 5,365,438 A | 11/1994 | Mitchell | |
| 6,759,851 B2 | 7/2004 | Hazelton | |
| 6,897,416 B2 * | 5/2005 | Bohlender et al. | 219/494 |
| 6,960,918 B2 | 11/2005 | Hazelton | |
| 2005/0036250 A1 | 2/2005 | Asano | |
| 2010/0191402 A1 * | 7/2010 | Aldrich et al. | 701/29 |
| 2010/0230505 A1 * | 9/2010 | Ribadeneira et al. | 237/5 |
| 2011/0132291 A1 * | 6/2011 | Ulrey et al. | 123/41.1 |
| 2011/0251019 A1 * | 10/2011 | Ulrey et al. | 477/98 |

OTHER PUBLICATIONS

Mueller, Stefan, Diagnostic and Control Systems for Automotive Power Electronics, SAE Technical Paper Series, Mar. 5-8, 2001.

* cited by examiner

*Primary Examiner* — Marthe Marc-Coleman
(74) *Attorney, Agent, or Firm* — David B. Kelley; Brooks Kushman P.C.

(57) ABSTRACT

A system and method for determining functionality of a single signal wire actuator of a vehicle monitor the signal wire for a heartbeat signal after commanding the actuator and waiting for a self-diagnostic period. In one embodiment, a hybrid vehicle includes an engine, an electric heater, a heater core and a valve positioned to route coolant through an engine and/or an electric heater. An actuator positioned to circulate coolant through the electric heater and the heater core is configured to transmit a heartbeat signal while connected to a power source and a ground terminal. A vehicle controller may be configured to store a diagnostic code, start the engine and/or control the valve to selectively route coolant through the engine and the heater core in response to a heat request and the heartbeat signal not being received from the actuator within a predetermined interval of time.

20 Claims, 4 Drawing Sheets

SYSTEM AND METHOD FOR CONTROLLING A VEHICLE HAVING A SINGLE-WIRE ACTUATOR

CROSS-REFERENCE TO RELATED APPLICATIONS

This application claims the benefit and priority of U.S. Provisional Application Ser. No. 61/716,482 filed on Oct. 19, 2012 titled "Control Strategy For Vehicles Having Single Wire Actuators," the disclosure of which is hereby incorporated by reference in its entirety.

TECHNICAL FIELD

The present disclosure relates to controlling a vehicle having a single-wire actuator, such as a heater or auxiliary pump in a hybrid or electric vehicle.

BACKGROUND

Electrical heating systems may be utilized to supplement the heat provided by an engine and to heat the passenger compartment of a vehicle. While often used in electric vehicles powered solely by a traction battery and hybrid electric vehicles having an internal combustion engine in combination with a fraction battery, such heating systems may also be found in other applications. For example, electric heating systems may be utilized in air conditioners, dehumidifiers, dryers, portable heaters and other electrical appliances.

To provide passenger comfort in vehicle applications, vehicles have the capability to heat or cool the passenger compartment. Conventional vehicles use waste heat from the engine as the sole source of heating for the passenger compartment. With the advent of Battery Electric Vehicles (BEV), there is little or no waste heat available for use in heating the vehicle cabin. As such, BEVs may use an electric heater to warm the passenger compartment. Similarly, although Hybrid Electric Vehicles (HEV) include a small internal combustion engine that may provide some waste heat for heating the vehicle cabin, these vehicles are designed to minimize the use of the engine to maximize fuel economy. As such, these vehicles pose different heating challenges because the engine may not always be running and generating waste heat for use by the heating system. Plug-in Hybrid Electric Vehicles (PHEV) compound this issue by running with the engine off for significant periods of time. To provide optimal fuel economy benefits, it is desired to heat the passenger compartment without having to rely solely on engine waste heat.

As such, various alternatives have been developed to heat the passenger compartment of electric and hybrid electric vehicles. One such solution uses an electric heater as a heat source to provide heat for electric vehicles and/or supplement heat from the engine in hybrid vehicles when engine waste heat is insufficient to meet a heating demand for the vehicle cabin. In addition, electric and hybrid electric vehicles may use one or more mechanically and/or electrically driven actuators to pump coolant through the engine and/or electric heater. For example, such systems may include a main or primary water pump in addition to one or more auxiliary water pumps that may be utilized to circulate coolant through various coolant circuits whenever heating is required in the passenger compartment of a vehicle, or to heat other vehicle components. In particular, during vehicle operations where the engine is off, an auxiliary water pump may be utilized to pump coolant through the electric heater to a heater core to provide heat to the vehicle cabin.

Various commercially available actuators configured to circulate coolant may include some integrated diagnostic or self-test functions to determine operating state. However, these diagnostics may not be sufficient or suitable for some applications. In particular, integrated actuator diagnostics may not provide sufficient or timely feedback to determine whether the actuator is functioning as desired for a particular application. In vehicle applications, various operating conditions of the actuator may neither be observable by a controller nor communicated to the controller. For example, in one application, a simple low-cost interface between an actuator such as an auxiliary coolant pump and the controller that controls it is a single wire that has a low side driver in the controller for primary control and a low side driver in the actuator that may be used under certain operating conditions. The controller may be able to detect various operating conditions of the coolant pump, but may not detect an open ground to the simple actuator, for example. Similarly, the auxiliary pump may provide status information to the controller for various operating states, but not provide any indication of an open ground to the controller. As such, the controller may command the simple actuator on and even though the actuator does not actually operate, corresponding status information is not communicated back to the controller.

SUMMARY

A system and method for operating a vehicle powertrain determine actuator functionality based on signals transmitted by an actuator to a control module. The system and method may also include controlling one or more components, including a second actuator, to meet a heat request based on the actuator functionality.

In one embodiment, a hybrid vehicle includes an engine, an electric heater, a heater core and a valve positioned to route coolant through at least one of the engine and the electric heater. The hybrid vehicle also includes an auxiliary pump positioned to circulate coolant through the electric heater and the heater core. The auxiliary pump may be configured to transmit a heartbeat signal while connected to a power source and a ground terminal. The hybrid vehicle may further include a controller configured to store a diagnostic code in response to a heat request when the heartbeat signal is not received from the auxiliary pump within a predetermined period of time.

In another embodiment, a method for controlling a vehicle having an engine and an auxiliary pump includes receiving a heat request and commanding the auxiliary pump on, where the auxiliary pump is configured to transmit a heartbeat signal while connected to a power source and a ground terminal. The method may also include storing a diagnostic code when the heartbeat signal is not received from the auxiliary pump within a predetermined interval of time after the pump has been commanded on. The method may also include starting the engine to provide heat to the vehicle when the heartbeat signal is not received from the auxiliary pump within the predetermined interval of time. The method may further include communicating an operating state of the auxiliary pump to at least one vehicle component when the heartbeat signal is not received from the auxiliary pump within the predetermined interval or period of time.

In various embodiments, a method for controlling a vehicle having an engine and an auxiliary pump may include commanding the auxiliary pump on and starting the engine to provide heat to the vehicle, in response to a heat request, when a heartbeat signal is not received from the auxiliary pump within a predetermined interval of time. Other actions may include storing a diagnostic code to indicate inoperability of the auxiliary pump and activating an indicator within the vehicle, where the indicator may include a light, a sound, and/or a message. The method may further include waiting until a period of time has elapsed after commanding the auxiliary pump on before listening for a heartbeat signal transmitted by the auxiliary pump.

Various embodiments according to the present disclosure may provide one or more advantages. For example, a system or method according to the present disclosure may detect an open ground condition using the vehicle controller so that an external tool is not needed during manufacturing and assembly testing to detect the open ground condition in an auxiliary pump. Use of an on-board vehicle controller diagnostic rather than an end-of-line service tool allows integration of auxiliary pump testing with various other controller-based diagnostics and may reduce the complexity and time associated with manufacturing and assembly. In addition, controller-based diagnostics facilitate periodic or continuous testing and/or detection of various operating conditions of a single-wire actuator, such as an auxiliary pump in a hybrid vehicle.

The above advantages and other advantages and features will be readily apparent from the following detailed description of the preferred embodiments when taken in connection with the accompanying drawings.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Various embodiments of a heating control strategy according to the present disclosure may be implemented in vehicles, which may include vehicles having a powertrain with a single propulsion device, such as an internal combustion engine or an electric machine (motor/generator or traction motor) powered by a traction battery, for example. Vehicles may also have two or more propulsion devices, such as a first propulsion device and a second propulsion device. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an internal combustion engine is supplemented by a traction battery and at least one electric machine to further improve mileage and reduce vehicle emissions. A PHEV uses a larger capacity battery than a standard hybrid vehicle, and adds a capability to recharge the battery from an electric power grid, which supplies energy to an electrical outlet at a charging station. This further improves the overall vehicle system operating efficiency in an electric driving mode and in a hydrocarbon/electric blended driving mode.

Figure 1:
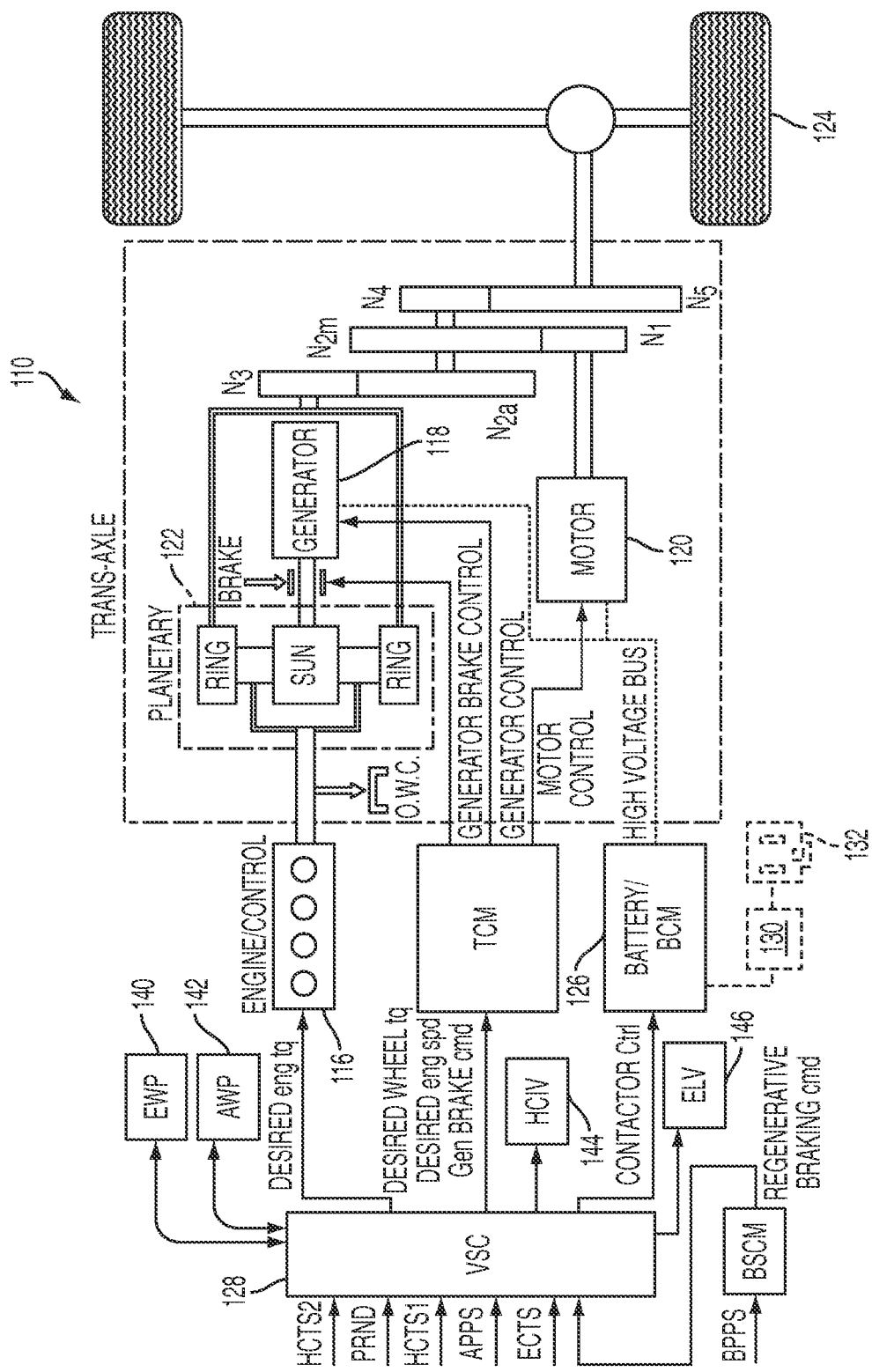
FIG. 1 is a schematic of a representative embodiment illustrating operation of a heating control strategy for a hybrid vehicle according to the present disclosure.

FIG. 1 illustrates an HEV 110 powertrain configuration and control system. A power split HEV 110 may be a parallel HEV. The HEV configuration as shown is for example purposes only and is not intended to be limiting as the present disclosure applies to BEVs, HEVs and PHEVs of any suitable architecture. In this powertrain configuration, there are two power sources that are connected to the driveline, which includes a combination of engine and generator subsystems using a planetary gear set 122 to connect to each other, and to the electric drive system (motor, generator, and battery subsystems). The battery subsystem is an energy storage system for the generator and the motor. The changing generator speed will vary the engine output power split between an electrical path and a mechanical path. In a vehicle 110 with a power split powertrain system, unlike conventional vehicles, engine 116 requires either the generator torque resulting from engine speed control or the generator brake torque to transmit its output power through both the electrical and mechanical paths (split modes) or through the all-mechanical path (parallel mode) to the drivetrain for forward motion as is generally known in the art.

During operation using the second power source, the electric motor 120 draws power from the battery 126 and provides propulsion independently of the engine 116 for forward and reverse motions. This operating mode is called "electric drive" or electric-only mode or EV mode. The operation of this power split powertrain system, unlike conventional powertrain systems, integrates the two power sources to work together seamlessly to meet the driver's demand without exceeding the system's limits (such as battery limits) while optimizing the total powertrain system efficiency and performance.

As shown in FIG. 1, a vehicle system controller (VSC) 128 coordinates control of the powertrain in addition to implementing the vehicle heating strategy as illustrated and described in greater detail with reference to FIG. 2. Under normal powertrain conditions, the VSC 128 interprets the driver's demands (e.g. PRND and acceleration or deceleration demand), and then determines the wheel torque command based on the driver demand and powertrain limits. In addition, the VSC 128 determines when and how much torque each power source needs to provide to meet the driver's torque demand and to operate at a desired operating point (torque and speed) of the engine. The battery 126 may be additionally rechargeable in a PHEV vehicle 110 configuration (shown in phantom), using a receptacle 132 which is connected to the power grid or other outside electrical power source and is coupled to battery 126, possibly through a battery charger/converter 130.

The vehicle 110 may be operated in electric vehicle mode (EV mode), where the battery 126 provides all of the power to the electric motor 120 to operate the vehicle 110. In addition to the benefit of saving fuel, operation in EV mode may enhance the ride comfort through lower noise and better driveability, e.g., smoother electric operation, lower noise, vibration, and harshness (NVH), and faster response. Operation in EV mode also benefits the environment with zero emissions from the vehicle during this mode. However, operation in EV mode provides little or no waste heat that can be used to heat the passenger cabin, or to heat various other vehicle components to provide desired vehicle performance or emissions control when starting and running engine 116, for example.

Vehicle 110 may include a climate control system with various climate control functions coordinated by controller 128. Alternatively, a separate climate control computer may be provided and may communicate with VSC 128 over a wired and/or wireless network using a standard protocol, such as the controller area network (CAN) protocol, for example. The VSC may include various inputs (e.g., engine coolant temperature sensor (ECTS) and heater core temperature sensors (HCTS1, HCTS2)), and outputs connected to sensors and actuators to control heating and cooling of the vehicle cabin and/or vehicle components in response to operator input and/or vehicle and ambient operating conditions. For example, VSC 128 may include outputs connected to the electric water pump (EWP) 140, the auxiliary water pump (AWP) 142, heater core isolation valve (HCIV) 144 and the engine coolant valve (ECV) 146. A human-machine interface (HMI) implemented using voice activation, touch screen, and/or knobs, sliders, and buttons, may be used to set a desired cabin temperature or operating mode that is used by VSC 128 and/or a climate control system computer to implement the vehicle heating strategy as described in greater detail herein.

Various approaches are taken to meet a vehicle heating demand, which may be based on operator input and/or ambient operating conditions as previously described. Referring to FIG. 2, one embodiment for a vehicle heating strategy for heating the passenger compartment of a PHEV is shown. The system or method for vehicle heating illustrated in FIG. 2 provides two sources of coolant heating. The system may use heat from engine 116 to heat the coolant as in a conventional ICE vehicle. The system may also use an electric heater 224, implemented by a positive temperature coefficient (PTC) heater in this embodiment, to heat the coolant. Having multiple sources of heat allows flexibility during normal operating conditions and some redundancy during operating conditions where heat from one source is insufficient or unavailable. Coolant from the different heat sources flows through the heater core 230. The system may use an HCIV 144 and an ECV 146 to selectively route coolant from the different heat sources. The system may also use an ECV 146 that selectively routes coolant. A VSC module 128 (FIG. 1) may control the operation of the system, or may coordinate control of the system with a climate control computer or control module as previously described. The VSC may determine the heating mode based on the heat request and the status of the various components in the heating system, and in particular, the status of electric heater 224.

Figure 2:
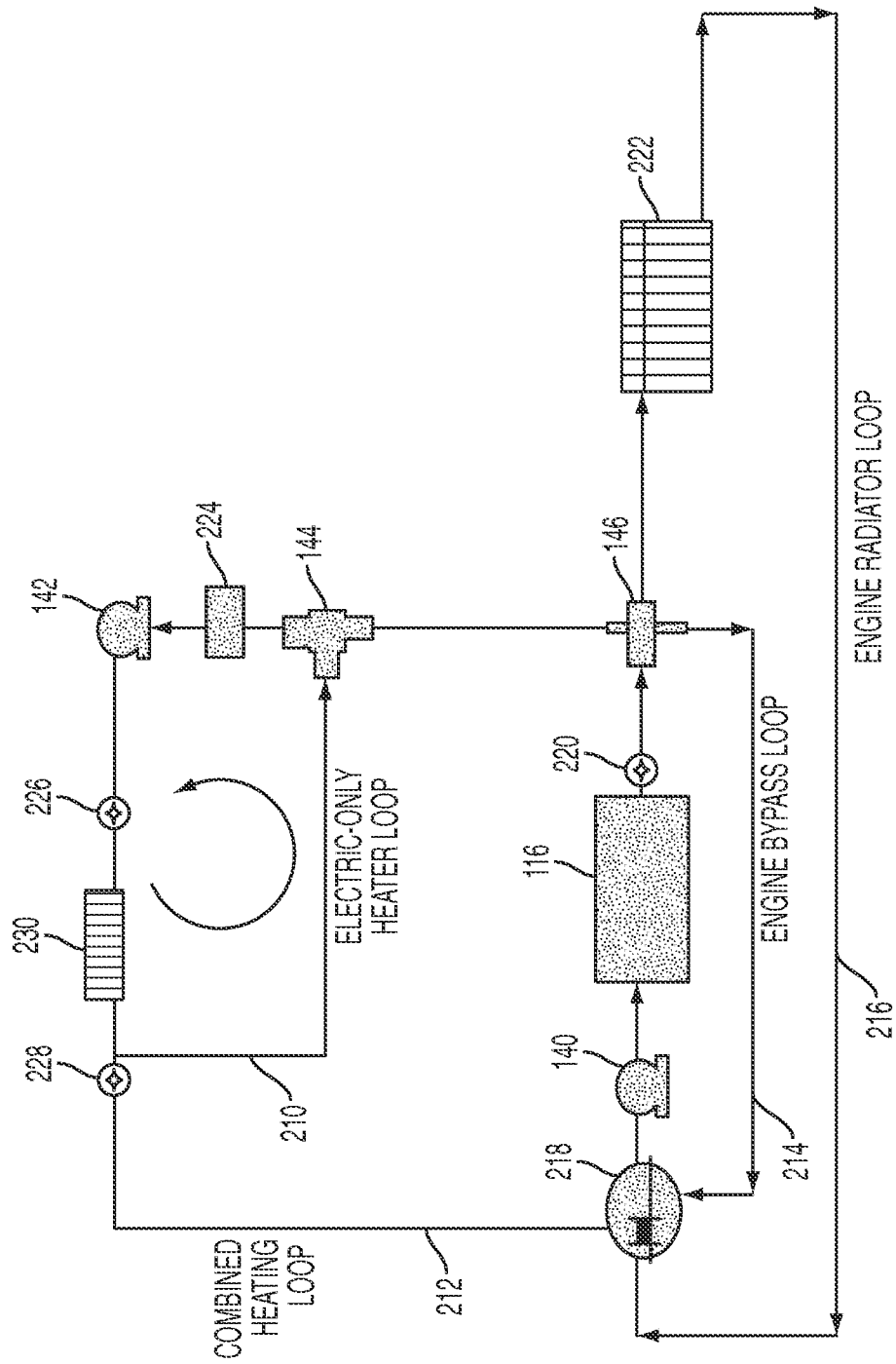
FIG. 2 is a schematic representation of an engine coolant circuit for a vehicle according to an embodiment of the present disclosure.

Still referring to FIG. 2, the system may also utilize AWP 142 and EWP 140 to move coolant through the system. Multiple temperature sensors may be utilized to measure the temperature of coolant entering and exiting the heater core 230. For example, a first heater core temperature sensor (HCTS1) 226 may be included to measure the temperature of coolant entering the heater core 230 and a second heater core temperature sensor (HCTS2) 228 may be included to measure temperature of coolant exiting the heater core 230. The system may also have a radiator 222 to dissipate heat in the coolant and a thermostat 218 to control the flow of coolant between the radiator 222 and the engine 116.

As shown in FIG. 2, multiple coolant paths are available for managing temperature of the engine and vehicle cabin using the coolant. Coolant paths depicted in this embodiment include an electric-only heating loop 210, a combined heating loop 212, an engine radiator loop 216 and an engine bypass loop 214. The electric-only heating loop 210 routes coolant through electric heater 224, AWP 142, by HCT sensors 226, 228 and through heater core 230. In this heating loop, electric heater 224 heats the coolant independently of any coolant flowing through engine 116. More specifically, AWP 142 circulates coolant through heater core 230 and electric heater 224.

In the combined heating loop 212, both engine 116 and electric heater 224 may provide heat to the coolant. EWP 140 may be configured to pump coolant through engine 116 and an electric heater 224. When engine 116 is running, heat from engine 116 is transferred to the coolant. The engine coolant may flow through HCIV 144, electric heater 224, AWP 142 and heater core 230 back to thermostat 218 and EWP 140. In addition, AWP 142 may also be turned on to assist the flow of coolant through the system.

Additionally, HCIV 144 may be configured to allow coolant to flow through either electric-only heating loop 210 or combined heating loop 212. HCIV 144 may be a three-way valve that allows one port to be alternately connected to each of the other two ports based on the operating mode. HCIV 144 may also be operated in such a way to allow coolant to flow from the engine 116 to the electric heater 224, which forms the combined heating loop 212. Similarly, ECV 146 may be configured to allow coolant to flow through engine bypass loop 214 and/or engine radiator loop 216.

Engine-radiator loop 216 may be used to provide cooling for engine 116. Engine-radiator loop 216 may consist of an EWP 140 that is selectively controlled to circulate coolant through engine 116 and radiator 222. Engine-radiator loop 216 may also include a thermostat 218 capable of regulating the flow of coolant into engine 116 based on the coolant temperature. Specifically, the thermostat 218 may allow coolant to flow through the engine radiator loop 216 when the coolant temperature reaches a set-point threshold.

Figure 3:
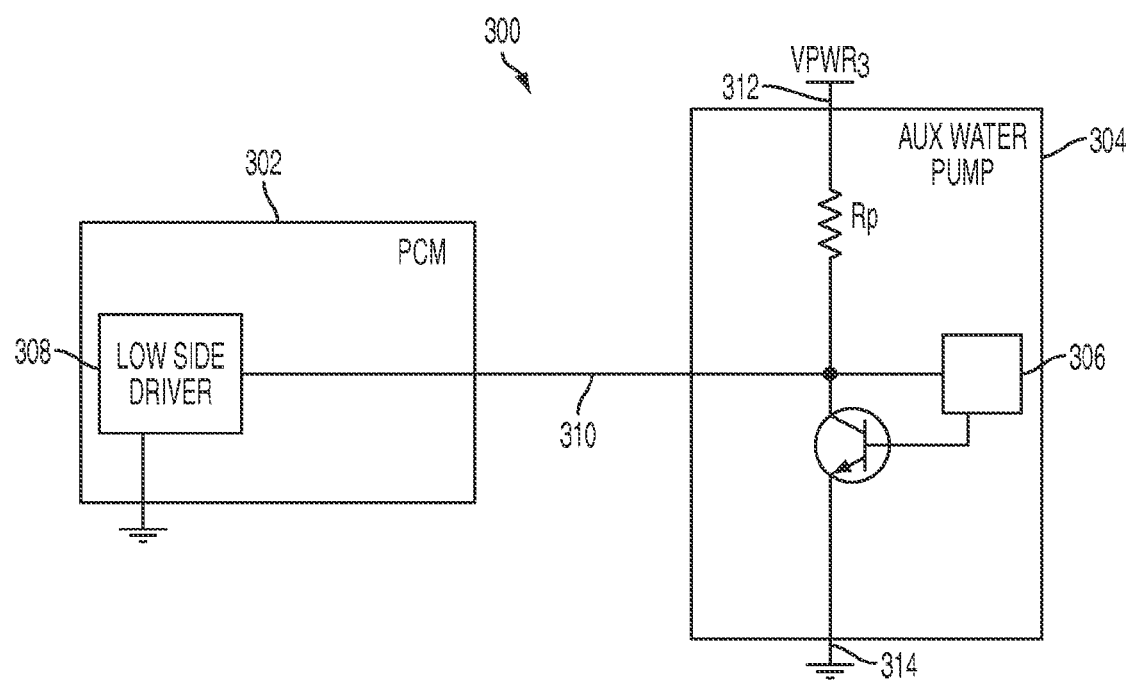
FIG. 3 is a schematic of a representative actuator capable of implementing an embodiment of the present disclosure.

As described above, a single-wire actuator in an electric or hybrid electric vehicle may include an electrically driven water pump configured to move fluid through a fluid loop. FIG. 3 illustrates a single-wire actuator configuration and control system for an electrically driven auxiliary water pump 304 according to the present disclosure. The actuator configuration as shown is for example purposes only and is not intended to be limiting as the present disclosure applies to actuators of any suitable type and application.

FIG. 3 depicts a simple interface 300 between an auxiliary water pump 304 and a control module 302. Control module 302 may include one or more low side drivers 308 for connection to an associated single-wire actuator via a corresponding signal line 310 to control operation of the actuator. Low side driver 308 may selectively provide a path to ground to control the associated actuator with power provided by a separate battery connection, such as connection 312. Similarly, auxiliary water pump 304 may include a low side driver 306 with associated electronics to provide various diagnostics relative to pump operation. In one embodiment, auxiliary water pump 304 includes electronics 306 capable of generating a heartbeat signal (e.g., 2 Hz) applied to signal line 310 for transmission to control module 302 for diagnostic feedback. Control module 302 may be a powertrain control module (PCM) or a hybrid powertrain control module (HPCM), for example. Auxiliary water pump 304 may be coupled to a vehicle wiring harness via a 3-wire connector that connects auxiliary water pump to a power source 312, a ground terminal 314, and a signal line 310 that may allow communication with control module 302. Signal line 310 may be used to provide a pulse width modulated (PWM) signal, for example. Although connected by a three-wire or three-pin connector to the vehicle wiring harness, only a single wire connection is provided from auxiliary water pump 304 to control module 302 to control actuation of auxiliary water pump 304 and provide diagnostic feedback.

Various types of vehicle control modules, such as exemplary control module 302, may provide diagnostics to detect operating conditions of an actuator such as an open signal line, a signal short to power, a signal short to ground, or an actuator power open, for example. However, the control module may not be able to detect an actuator ground open condition. Similarly, an actuator may include integrated diagnostics that provide some level of feedback with regard to actuator functionality. However, these diagnostics may not be sufficient to detect and/or communicate particular conditions associated with the operating state of the actuator, such as an actuator open ground condition, particularly for actuators using a low side driver and connected to a control module by a single signal wire.

With continuing reference to FIG. 3, an actuator, implemented by an auxiliary water pump 304 in this embodiment, may be configured to transmit a diagnostic feedback signal and/or a heartbeat signal to control module 302 across signal line 310 indicating that the pump is properly connected to a power source 312 and a ground terminal 314. When control module 302 actuates pump 304, pump 304 may perform various diagnostics to detect current operating conditions and transmit a corresponding code or signal to control module 302 over signal line 310. The diagnostic feedback may be transmitted using a pulse width or frequency modulated signal by pulling the signal line low for a period of time over a pre-selected duration of time (e.g., pulling the signal line low every 0.5 s for a duration of 0.5 s). Auxiliary pump 304 transmits a heartbeat signal across the signal line 310 when no diagnostic code or signal is being transmitted. The heartbeat signal may also be considered a type of default diagnostic code or signal and may be generated in a similar fashion as the diagnostic code(s) associated with a particular operating condition by pulling the signal line low for a different calibrated amount of time and then allowing the line to go high for a another calibrated amount of time.

A missing and/or lack of a heartbeat signal during a predetermined interval of time indicates that auxiliary pump 304 may not be functioning. In response, controller 302 may store an associated diagnostic code and/or initiate various remedial actions. Control module 302 may wait a first predetermined period of time or diagnostic delay period to allow the actuator to power-up and perform various internal diagnostics and transmit a diagnostic code or heartbeat signal. If no heartbeat signal is transmitted within a specified period of time after the diagnostic delay period, then the control module determines the pump is inoperative and may execute various application-specific control actions. In the representative embodiment illustrated, control module 302 may actuate other available pumps (e.g., electric pump) to circulate fluid through the system and operate the vehicle in a hybrid mode, for example, in response to not receiving or detecting a heartbeat signal during a corresponding time interval.

Figure 4:
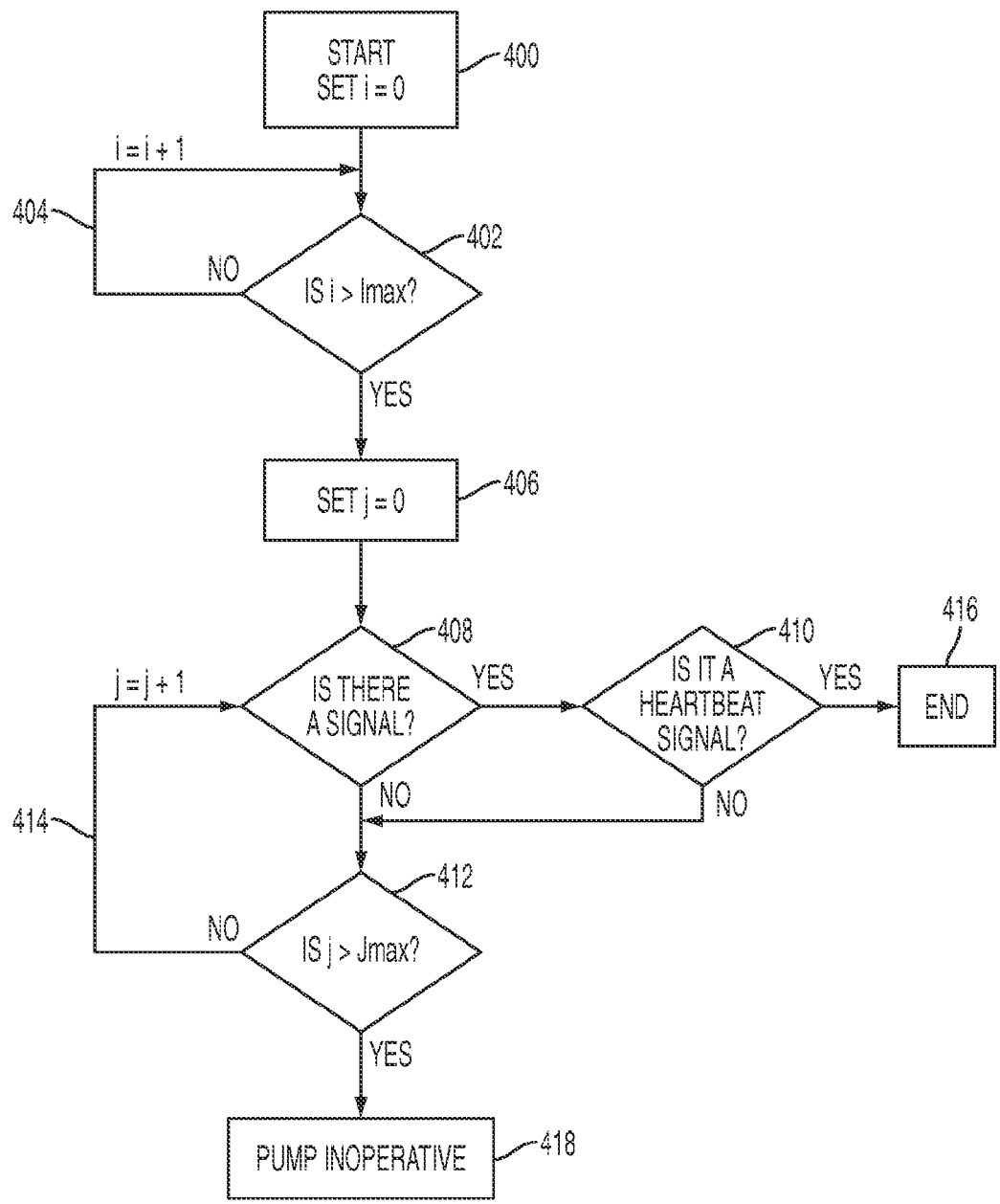
FIG. 4 is a flowchart illustrating a system and/or method for determining actuator functionality according to an embodiment of the present disclosure.

FIG. 4 is a flowchart illustrating operation of a system and/or method for determining actuator functionality according to an embodiment of the present disclosure. As those of ordinary skill in the art will understand, the functions represented in FIG. 4 may be performed by software and/or hardware depending on the particular application and implementation. The various functions may be performed in an order or sequence other than illustrated in FIG. 4 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, as shown in FIG. 4, a functionality test is performed whenever the actuator, implemented by an auxiliary water pump in one embodiment, is commanded on. In this embodiment, a powertrain controller initiates the functionality test at block 400 in response to a heat request or another request resulting in desired operation of the auxiliary water pump. A first predetermined period of time to allow completion of internal pump diagnostics is initiated by setting a first counter to zero (i.e., i=0) at 400. The controller then examines, at block 402, whether the first counter exceeds a predetermined interval of time, $I_{max}$, associated with the period of time required for the pump to reach full power, perform internal diagnostics, and begin transmitting a diagnostic feedback signal. If the first counter has not exceeded $I_{max}$, the controller increments the value of the first counter and repeats the control loop beginning from block 402 as shown at 404 until the first counter exceeds $I_{max}$. After the first predetermined time period expires as indicated when the first counter exceeds the corresponding threshold $I_{max}$, the controller initiates a second interval of time or predetermined time period for monitoring the signal line by setting a second counter to zero (i.e., j=0) at block 406.

The controller then monitors signal line 310 for any signals received from the auxiliary water pump at block 408. If a signal is detected at 408, the controller evaluates at 410 whether the signal transmitted is a heartbeat signal. As described above, the heartbeat signal is a specific kind of feedback signal transmitted from the auxiliary water pump to the control module while the auxiliary water pump is properly connected to a power source and a ground terminal unless a diagnostic code is being transmitted or the auxiliary water pump is inoperative. If the signal corresponds to the heartbeat signal at 410, then the controller ends the functionality test and the auxiliary water pump is considered operational, as shown at block 416. If the signal is not a heartbeat signal as determined at 410, or if no signal is detected at 408, the controller evaluates, at block 412, whether the second counter exceeds a corresponding timer threshold, $J_{max}$, associated with the second period of elapsed time. If the second counter does not exceed $J_{max}$, the controller increments the value of the second counter and iterates the control loop beginning from block 412 as shown at 414. If a heartbeat signal is not received after expiration of the second time interval represented by blocks 408, 416, and 412, the auxiliary water pump is determined to be inoperative at block 418. In one embodiment, the functionality test represented in FIG. 4 may be performed a predetermined number of times before determining that the actuator is inoperative.

The controller may execute various actions in response to receiving a diagnostic code from the actuator, or in response to determining that the actuator is inoperative. For example, the controller may store a diagnostic code and/or start the engine. In addition, various other actions may be executed when the auxiliary water pump is not properly functioning. For example, other actions may include commanding the auxiliary water pump off, communicating the operating condition of the auxiliary water pump to the main or primary pump (e.g., EWP), commanding the main or primary pump to circulate coolant to the heater core, controlling an isolation valve to route coolant through the combined heating loop, operating the vehicle in hybrid mode and/or activating an indicator to alert a vehicle operator or service technician. The indicator may be a light (e.g., a wrench light), a sound, or a message.

As such, various embodiments according to the present disclosure may detect an open ground condition using the vehicle controller and integrated electronics of an actuator so that an external tool is not needed during manufacturing and assembly testing to detect an open ground condition. Use of an on-board vehicle controller diagnostic rather than an end-of-line service tool allows integration of auxiliary pump testing with various other controller-based diagnostics and may reduce the complexity and time associated with manufacturing and assembly. In addition, controller-based diagnostics according to embodiments of the present disclosure facilitate periodic or continuous testing and/or detection of various operating conditions of a single-wire actuator, such as an auxiliary pump in a hybrid vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A hybrid vehicle, comprising:
   an engine;
   an electric heater;
   a heater core;
   a valve positioned to route coolant through at least one of the engine and the electric heater;
   an auxiliary pump positioned to circulate coolant through the electric heater and the heater core, the auxiliary pump being configured to transmit a heartbeat signal while connected to a power source and a ground terminal; and
   a controller configured to start the engine to provide heat to the vehicle, in response to a heat request and the heartbeat signal is not is not being received from the auxiliary pump within a predetermined interval of time.

2. The hybrid vehicle of claim 1, wherein the predetermined interval of time begins after a delay period triggered by the heat request.

3. The hybrid vehicle of claim 1, wherein the controller is further configured to control a main pump to circulate coolant through the engine to the heater core, in response to the heat request and the heartbeat signal not being received from the auxiliary pump within the predetermined interval of time.

4. The hybrid vehicle of claim 1, wherein the controller is further configured to store a diagnostic code, in response to the heat request and the heartbeat signal not being received from the auxiliary pump within the predetermined interval of time.

5. The hybrid vehicle of claim 1, wherein the controller is further configured to control at least one vehicle component, in response to the heat request and the heartbeat signal not being received from the auxiliary pump within the predetermined interval of time.

6. The hybrid vehicle of claim 5, wherein the at least one vehicle component is a main pump configured to circulate coolant from the engine to the heater core.

7. The hybrid vehicle of claim 1, wherein the controller is configured to activate an indicator within the vehicle, in response to the heat request and the heartbeat signal not being received from the auxiliary pump within the predetermined interval of time, the indicator including at least one of a light, a sound, and a message.

8. The hybrid vehicle of claim 1, wherein the controller is further configured to operate the vehicle in a hybrid mode, in response to the heat request and the heartbeat signal not being received from the auxiliary pump within the predetermined interval of time.

9. A method for controlling a vehicle having an engine and an auxiliary pump, comprising:
   commanding the auxiliary pump on, by a controller, in response to a heat request, the auxiliary pump being configured to transmit a heartbeat signal at all times while connected to a power source and a ground terminal; and
   storing a diagnostic code, by the controller, when the heartbeat signal is not received from the auxiliary pump within a predetermined interval of time after the pump has been commanded on.

10. The method of claim 9, further comprising:
    controlling a main pump to circulate coolant through the engine to a heater core when the heartbeat signal is not received from the auxiliary pump within the predetermined interval of time.

11. The method of claim 9, further comprising:
    starting the engine to provide heat to the vehicle when the heartbeat signal is not received from the auxiliary pump within the predetermined interval of time.

12. The method of claim 9, further comprising:
    commanding the auxiliary pump off when the heartbeat signal is not received from the auxiliary pump within the predetermined interval of time.

13. The method of claim 9, further comprising:
    communicating an operating state of the auxiliary pump to at least one vehicle component when the heartbeat signal is not received from the auxiliary pump within the predetermined interval of time.

14. The method of claim 13, wherein the at least one vehicle component is a main pump configured to circulate coolant from the engine to a heater core.

15. A method for controlling a vehicle, comprising:
commanding an auxiliary pump on, by a controller, the auxiliary pump being configured to transmit a heartbeat signal at all times while connected to a power source and a ground terminal; and
starting an engine using the controller to provide heat to the vehicle, in response to a heat request and the heartbeat signal not being received from the auxiliary pump within a predetermined interval of time.

16. The method of claim 15, further comprising:
storing a diagnostic code to indicate inoperability of the auxiliary pump when the heartbeat signal is not received from the auxiliary pump within the predetermined interval of time after the pump has been commanded on.

17. The method of claim 15, further comprising:
activating an indicator within the vehicle when the heartbeat signal is not received from the auxiliary pump within the predetermined interval of time, the indicator including at least one of a light, a sound, and a message.

18. The method of claim 15, further comprising:
controlling a valve to selectively route coolant through the engine to a heater core, in response to the heat request, when the heartbeat signal is not received from the auxiliary pump within the predetermined interval of time.

19. The method of claim 15, further comprising:
operating the vehicle in a hybrid mode, in response to the heat request, when the heartbeat signal is not received from the auxiliary pump within the predetermined interval of time.

20. The method of claim 15, further comprising:
waiting until a period of time has elapsed after commanding the auxiliary pump on before listening for the heartbeat signal to be transmitted by the auxiliary pump.

* * * * *